US008407106B1

(12) United States Patent  (10) Patent No.: US 8,407,106 B1
Saad  (45) Date of Patent: *Mar. 26, 2013

(54) EXPERT SYSTEM RECOMMENDATIONS OPTIMIZING CONSUMER SELECTIONS OF PRODUCT OPTIONS

(76) Inventor: Ihab L. Saad, Huntington, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/413,340

(22) Filed: Mar. 6, 2012

Related U.S. Application Data

(63) Continuation of application No. 10/459,956, filed on Jun. 12, 2003, now Pat. No. 8,155,577.

(60) Provisional application No. 60/389,867, filed on Jun. 19, 2002.

(51) Int. Cl.
   G06Q 30/00 (2006.01)
   G09B 3/00 (2006.01)
(52) U.S. Cl. .................. 705/26.7; 434/318; 434/350
(58) Field of Classification Search .............. 434/350, 434/318; 705/14, 26, 26.1–27.2; 704/270
   See application file for complete search history.

(56) References Cited

U.S. PATENT DOCUMENTS

| | | | |
|---|---|---|---|
| 5,727,950 A | 3/1998 | Cook et al. |
| 5,809,481 A | 9/1998 | Baron et al. |
| 5,810,605 A | 9/1998 | Siefert |
| 5,884,282 A | 3/1999 | Robinson |
| 5,904,485 A | 5/1999 | Siefert |
| 5,918,014 A | 6/1999 | Robinson |
| 5,963,951 A | 10/1999 | Collins |
| 6,067,538 A | 5/2000 | Zorba et al. |
| 6,135,776 A | 10/2000 | Erturk et al. |
| 6,146,148 A | 11/2000 | Stuppy |
| 6,157,924 A | 12/2000 | Austin |
| 6,178,308 B1 | 1/2001 | Bobrow et al. |
| 6,201,948 B1 | 3/2001 | Cook et al. |
| 6,270,351 B1 | 8/2001 | Roper |
| 6,317,722 B1 | 11/2001 | Jacobi et al. |
| 6,321,221 B1 | 11/2001 | Bieganski |
| 6,334,779 B1 | 1/2002 | Siefert |
| 6,370,513 B1 | 4/2002 | Kolawa et al. |
| 6,427,063 B1 | 7/2002 | Cook et al. |
| 6,446,045 B1 | 9/2002 | Stone et al. |
| 2001/0018178 A1 | 8/2001 | Siefert |
| 2001/0034645 A1 | 10/2001 | Tenembaum |
| 2001/0036622 A1 | 11/2001 | Richter et al. |
| 2001/0037242 A1 | 11/2001 | Bataillon et al. |
| 2001/0044728 A1 | 11/2001 | Freeman et al. |
| 2001/0049087 A1 | 12/2001 | Hale |
| 2001/0055749 A1 | 12/2001 | Siefert |
| 2002/0010584 A1 | 1/2002 | Schultz et al. |
| 2002/0087416 A1 | 7/2002 | Knutson |
| 2003/0101150 A1 | 5/2003 | Agnihotri et al. |

*Primary Examiner* — Kang Hu
(74) *Attorney, Agent, or Firm* — Wooten & Shaddock, PLC (57) ABSTRACT

Systems and methods for making recommendations to a consumer, including, accessing a first and a second consumer profile database; allowing a consumer to request information regarding a product from a product database; selecting all products in the product database; removing all of the products that are not included in a similar product area with the requested product; establishing an initial product recommendation value for each remaining selected products; transforming the initial product recommendation value for each of the remaining selected products based on a comparison of the subjective product evaluation information and at least some consumer profile information and/or supplemental consumer profile information to produce a final recommendation value for each of the remaining selected products; creating a ranked list of the remaining selected products by each remaining selected product's final recommendation value; and displaying data regarding the ranked list of the remaining selected products to the consumer.

12 Claims, 3 Drawing Sheets

Lesson Plan for │John Smith

Semester/Quarter: 2     School Year: 2002

Class: Social Studies     Date: June 7, 2002     Status: ⦿ Incomplete
◯ Complete Assignment:

Materials Used:

Objective:

Process Used:

FIG. 3

EXPERT SYSTEM RECOMMENDATIONS OPTIMIZING CONSUMER SELECTIONS OF PRODUCT OPTIONS

CROSS-REFERENCE TO RELATED APPLICATIONS

This application claims the benefit of U.S. Provisional Application Ser. No. 60/389,867, filed Jun. 19, 2002 and U.S. patent application Ser. No. 10/459,956, filed Jun. 12, 2003, the disclosures of which are incorporated herein by reference in their entireties.

BACKGROUND OF THE INVENTION

Field of the Invention

This invention relates generally to the field of interactive profiling, reporting, and tracking systems and programs.

SUMMARY OF THE INVENTION

The systems and methods of this invention utilize an education management system, which provides parents and/or teachers with profiling, reporting, tracking, and community outreach services. The features of this invention maintain and consolidate student information, such as, for example, profiles, reports, and scores in one integrated and interactive personal administration schooling system.

In various exemplary embodiments, the systems and methods of this invention facilitate the home education process, including selection and customization of curriculum materials, reporting, tracking, and community outreach, including communication and socialization. In other exemplary embodiments, the systems and methods of this invention may be utilized by teachers in a more formal private or public school setting. These systems and methods provide educators, whether they are parents or professional teachers or instructors, with more time to train by reducing labor-intensive administrative chores.

More specifically, the invention allows educators to have access, via, for example, the Internet, to resources typically only available to teachers in more traditionally organized school systems. The interactive systems and methods of this invention provide at least one of profiling of students and educational products, reporting engines, tracking features, and community outreach programs.

The profiling feature presents an educator with a series of questions regarding the student, some optional and some necessary, to be completed by the teacher or instructor. The questions and responses are effectively weighted based on predetermined factors, such that information that is more relevant to, for example, suggesting an appropriate educational product or curriculum material (such as questions regarding the student's special needs or religious preference) are given greater weight than personal identification information (such as the student's name and address).

When the specific student information is received, the information is used to create a specific student profile, which is then stored in a database and used to select educational products that are particularly suited to the specific student's profile.

For example, if a student's age, gender, interests, skill level, known learning disabilities, and religious preferences are provided, the systems and methods of this invention may weight the known learning disabilities and religious preferences information more heavily than the age, gender, interests and skill level information. The specific student profile is then used to match the student to recommended educational resources and curriculum materials (also weighted to the specific student profile information) for that student, based on the specific student profile and product profiles. This virtually eliminates the need for the educator to perform complex analysis of the student against the various available curriculum materials.

By profiling each individual student, the educator also utilizes the systems and methods of this invention to purchase and receive the selected educational products, curriculum materials and lesson plans for each student.

Because the systems and methods of this invention are able to be accessed and utilized over a network, users also have a community outreach feature, which allows them to communicate with other users via e-mail and messaging, and through public and private chat rooms and/or clubs. Users or groups of users may, for example, participate in polls, learn important factual points, discuss curriculum ideas, and/or receive quarterly newsletters authored by leaders in education.

The reporting feature provides a series of reports, such as, for example, an accessible progress record and/or report card for each student. A user may download documents for printing and submission to, for example, other parents, teachers or educational boards and governing authorities.

The tracking feature provides educators with technology empowered tools to monitor on an on-going basis over time the placement, performance, and scoring of their students. These tools are specifically designed to track resource allocation (financial, human and temporal) on a dynamic scale.

BRIEF DESCRIPTION OF THE DRAWINGS

Exemplary embodiments of the systems and methods according to this invention will be described in detail, with reference to the following figures, wherein.

DETAILED DESCRIPTION OF EXEMPLARY EMBODIMENTS

For simplicity and clarification, the operating principles, design factors, and layout of the education management systems and methods, according to this invention, are explained with reference to various exemplary embodiments of the education management systems and methods, according to this invention. The basic explanation of the operation of the education management systems and methods is applicable for the understanding and design of the constituent components and steps employed in the education management systems and methods according to this invention.

Furthermore, it should be understood that, although the various exemplary embodiments described herein are described with reference to education management systems and methods, this is merely for simplicity and clarification of the systems and methods of this invention. Therefore, it will be apparent to one of ordinary skill in the art that the systems and methods described herein are not to be construed as limited to an educational embodiment, but can be used in conjunction with any goods or services and are not limited to the field of education management. For example, the method for recommending resources and course materials based on a specific student profile may be used to recommend any product or service to a user based on a specific user profile or parameter.

Figure 1:
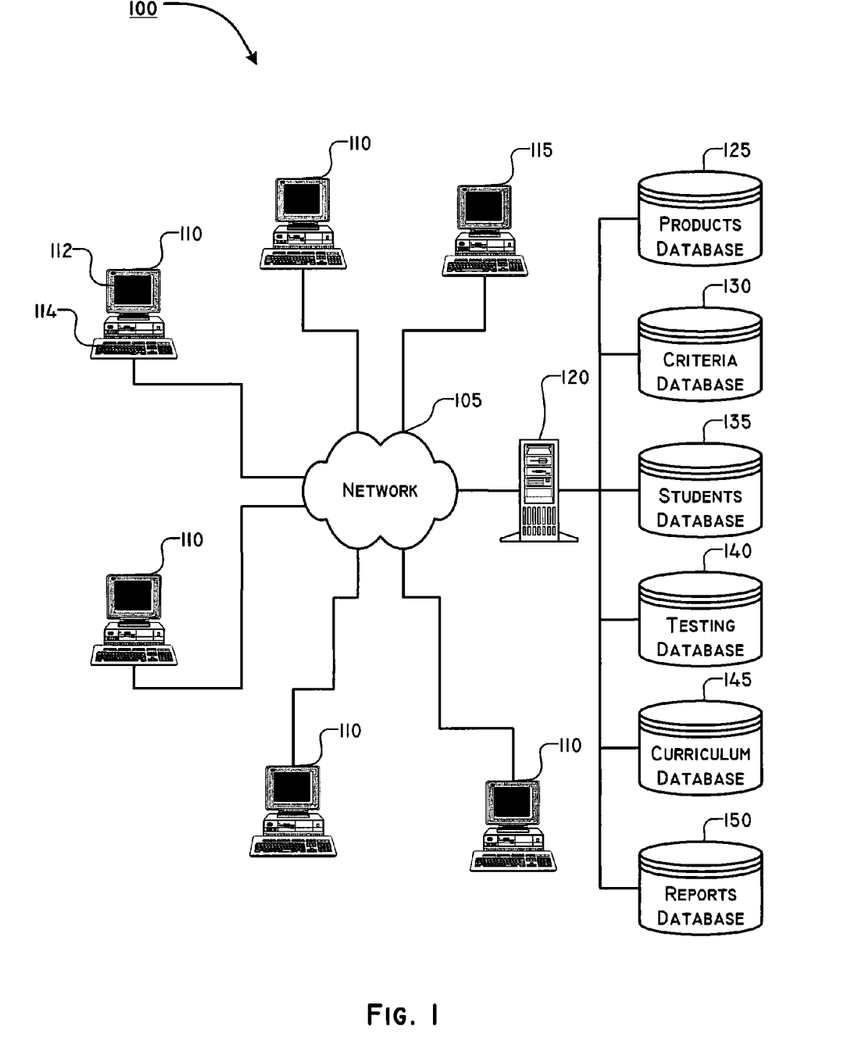
FIG. 1 shows a functional block diagram outlining a first exemplary embodiment of an education management system according to this invention.

FIG. 1 is a functional block diagram outlining a first exemplary embodiment of an education management system 100 according to this invention. As shown in FIG. 1, the education management system 100 includes at least some of at least one student computer 110, a management computer 115, and a server 120. In various exemplary embodiments, the education management system 100 includes a plurality of student computers 110. Each computer 110 is linked, either directly or indirectly, to a distributed network 105, and, in turn, to the server 120. The management computer 115 is also linked, either directly or indirectly, to the distributed network 105, and, in turn, to the server 120.

In various exemplary embodiments, the distributed network 105 is, for example, an intranet, an extranet, the Internet and, more particularly, the World Wide Web portion of the Internet, a Local Area Network (LAN), a Wide Area Network (WAN), or any other presently known or later developed distributed network. It should be appreciated that, in various exemplary embodiments, the distributed network 105 may be, for example, a particular node, such as, for example, a specific web page, of a larger distributed network.

In various exemplary embodiments, each of the computers 110 and 115, is typically a personal computer, such as a Windows-based workstation, having a memory containing communications software and some form of Internet connectivity, such as a modem, a T-1 line, an Integrated Services Digital Network (ISDN) line, or the like. The communications software may be any software suitable for telecommunications, and preferably includes Internet browser software. The Internet connector may be used with the communications software for communication, via the distributed network 105, to the server 120, any other computer 110, and/or the management computer 115.

It should be understood that at least one of the computers 110 may be a commercially available "Web-TV" device, such as those currently available from Phillips Electronics, Magnavox, and Sony Corporation. Alternatively, at least one of the computers 110 may be a Network Computer, such as those currently provided by Oracle and Microsoft.

In various exemplary embodiments, each of the computers 110 also includes a display 112 and one or more input devices 114. In various exemplary embodiments, the display 112 may be a cathode ray tube display, a liquid crystal display, or any other known or later developed system capable of displaying data. The one or more input devices 114 may be one or more of a keyboard, a mouse, a touch screen, a touch pad, a stylus, a microphone, a camera, or any other known or later developed device capable of inputting data into the computer 110.

It should be appreciated that the management computer 115 may include any or all of the features of the computer 110. However, the management computer 115 is not limited to the features included in any of the computers 110.

In various exemplary embodiments, the server 120 is a programmed network server, and, more specifically, a server that supports a HyperText Transfer Protocol (http). The server 120 is capable of maintaining profile records, testing documents and data, report documents and data, and user or student information, and other information, and transmitting such data and information, via the network 105, to an appropriate computer 110 or the management computer 115. Many suitable software programs for interfacing the server 120 with the network 105 exist, including, for example, Netscape, Apache, Microsoft IIS, and O'Reilly.

It should be appreciated that the server 120 and/or the management computer 115 utilize sufficient security methods to ensure safe storage and integrity of data, documents, or information.

The server 120 is connected, via linked connections, to at least some of a products database 125, a criteria database 130, a students database 135, a testing database 140, a curriculum database 145, and a reports database 150.

The products database 125 includes various suitable software programs and memory for storing and/or updating a plurality of product profile records. In various exemplary embodiments, the product profile records contained by the products database 125 comprise both inherent product information and evaluation product information regarding each of a plurality of products.

In various exemplary embodiments, the inherent product information includes, but is not limited to, each product's name or title, subject or topic covered, suggested grade level or levels, manufacturer, distributor, supplier, price, compatibility or equipment requirements (such as computer memory, input device, or operating system compatibility for computer software products), availability, and the like. The inherent product information may also include a description of the product and certain product keywords.

It should be appreciated that the type and level of inherent product information in the products database 125 may vary and may be updated periodically, as appropriate or necessary. The inherent product information is typically updated by the product's manufacturer, supplier, or distributor.

In various exemplary embodiments, the evaluation product information includes, for example, more subjective information regarding each individual product, such as, for example, whether the product has a particular religious orientation or contains religious content, and if so, what religion, whether the product is suitable for students with particular physical, mental, or emotional handicaps, and if so, what handicaps, whether the product is suitable for students with remedial, average, or advanced learning abilities, whether the product requires that the student be able to read, whether the product is more suited for an institutional or a home school setting, whether the product is suited for a student following a self-paced curriculum, whether the product is considered interactive, an evaluation of the learning style supported by the product, and the like.

In various exemplary embodiments, the evaluation product information includes, for example, answers to at least some of the product evaluation questions shown below in TABLE I. It should be appreciated that the product evaluation questions, as listed in TABLE I, are merely exemplary, and are not intended to be an exhaustive list of possible questions. Specific product evaluation questions may be created or deleted based on a particular application.

TABLE I

1. What is the product category? (i.e., Health & Fitness, Humanities, Language Arts, Life Enhancement, Mathematics, Sciences, Social Sciences, or Other)
2. What grade, if any, does the product target?
3. What state/region does the product target?
4. What gender does the product target?
5. This product is appropriate for the students in which academic environments? (i.e., Home School, Private School, or Public School)
6. What is the format of the primary product? (i.e., Audio Cassette, Audio CD, Computer CD-ROM, Computer Floppy Disk, DVD Player, or Paper/Book, VCR)

TABLE I-continued

7. What is the format of the supplemental components? (i.e., Audio Cassette, Audio CD, Computer CD-ROM, Computer Floppy Disk, DVD Player, or Paper/Book, VCR)
8. What student learning capability does the product target? (i.e., Advanced, Moderate, or Remedial)
9. Does the product require students to be self-paced?
10. Does the product require use of a computer keyboard?
11. Does the product require use of a computer mouse?
12. What reading level does the product require relative to that of grade level? (i.e., Low, Medium, or High)
13. Is the product interactive?
14. Is the product competitive?
15. Is the product specifically beneficial for students with disabilities? (i.e., Attention Deficit, Auditory, Muscle Control, Visual, or Other)
16. What learning style does the product target? (i.e., Demonstration/Example, Discovery/Exploratory, Hands-on/ Manipulative, or Rote-Learning/Skill-Based)
17. Is the product not recommended for students with disabilities? (i.e., Attention Deficit, Auditory, Muscle Control, Visual, or Other)
18. Does the product contain content specifically appropriate for students with religious orientations? (i.e., Christian, Jewish, Muslim, or Other)
19. Does the product contain content specifically inappropriate for students with religious orientations? (i.e., Christian, Jewish, Muslim, or Other)
20. Is the product entirely computer-based?
21. Is the product enhanced with a computer?
22. What operating system is the product compatible with? (i.e., Windows 95, Windows 98, Windows 2000, Windows ME, Windows NT, Mac 8x, or Mac 9x)
23. Does the product require Internet access? (i.e., Dial-Up Access, High Speed, or No Access)
24. If the product requires Internet access, what services does it provide? (i.e., Classes, Testing, Tutoring, or Product Support)

It should be appreciated that the type and level of evaluation product information in the products database 125 may also vary, and is typically updated in accordance with the systems and methods of this invention.

It should also be appreciated that specific information may be classified as inherent product information, evaluation product information, or both, and the classification of a specific piece of information as inherent product information, evaluation product information, or both may vary based on, for example, the specific application for which the product is being evaluated, or the level or reliability of information provided by a manufacturer or supplier.

The criteria database 130 includes various suitable software programs and memory for storing and/or updating criteria by which a product is evaluated by the systems and methods of this invention. For example, the criteria database 130 may include information as to whether products or curriculum should be evaluated for religious content, are included on a preferred supplier list, are well suited for a student with an advanced learning ability, are usable in a home school setting, are for a student following a self-paced curriculum, and the like.

The students database 135 includes various suitable software programs and memory for storing and/or updating a plurality of student profile records or student profile information. In various exemplary embodiments, the student profile records contained by the students database 135 comprise both student personal information and student performance information for each of a plurality of students. In various exemplary embodiments, the student personal information includes, for example, answers to at least some of the student questions shown below in TABLE II. It should be appreciated that the student questions, as listed in TABLE II, are merely exemplary, and are not intended to be an exhaustive list of possible questions. Specific student questions may be created or deleted based on a particular application.

However, it should be appreciated that the type and level of student personal information in the students database 135 may vary and may be updated periodically, as appropriate or necessary. The student personal information is typically updated by the student or the student's instructor.

TABLE II

1. What is the student's age?
2. What is the student's date of birth?
3. What is the student's gender?
4. What are the student's interests and activities? (i.e., Crafts, Music, Sports, etc.)
5. What is the student's grade?
6. What is the student's teacher's name?
7. What is the student's School's name?
8. School City or Town?
9. School State and Country?
10. Which areas of study are of interest? (i.e., Health & Fitness, Humanities, Language Arts, Life Enhancement, Mathematics, Sciences, Social Sciences, etc.)
11. What is the student's learning environment? (i.e., Home School, Private School, or Public School)
12. Do you have a computer for student use?
13. If yes, what operating system is the computer running? (i.e., Windows 95, Windows 98, Windows 2000, Windows Me, Windows NT, Mac 8x, Mac 9x, Mac 10, Linux, etc.)
14. In what year was the computer new?
15. If you have a computer, on a scale of 1 to 5, do you have access to the Internet?
16. If yes, are you interested in online services? (i.e., Chat, Classes, Testing, Tutoring, etc.)
17. Which of the following equipment do you have? (i.e., Audio Cassette, Audio CD, Computer CD-ROM, Computer Floppy Disk, DVD Player, VCR, etc.)
18. How would you characterize your student's learning ability relative to his/her age and grade level? (i.e., Advanced, Moderate, or Remedial)
19. How would you characterize your student's reading of English relative to his/her age and grade level?
20. Is the student primarily self-paced or under the direction of a parent/teacher?
21. On a scale of 1 to 5 - Does the student have basic keyboarding skills?
22. On a scale of 1 to 5 - Can the student navigate a computer screen with a mouse?
23. On a scale of 1 to 5 - Does the student prefer interactivity in the learning environment?
24. On a scale of 1 to 5 - Does the student work best in a competitive situation, like a video game?
25. Which of the following product formats does the student prefer? (i.e., Audio Cassette, Computer CD-ROM, DVD Player, Reader, Textbook, Video, Workbook, etc.)
26. For Mathematics, which learning styles does the student prefer? (i.e., Demonstration/Example, Discovery/Exploratory, Hands-on/ Manipulative, Rote-Learning/Skill-Based, etc.)
27. For Sciences, which learning styles does the student prefer? (i.e., Demonstration/Example, Discovery/Exploratory, Hands-on/ Manipulative, Rote-Learning/Skill-Based, etc.)
28. For Social Sciences, which learning styles does the student prefer? (i.e., Informational, Rote-Learning/Skill-Based, etc.)
29. For Language Arts - Reading, which learning styles does the student prefer? (i.e., Auditory/Phonetic or Visual/Sight-Based)
30. For Language Arts - Mechanics, which learning styles do the student prefer? (i.e., Context/Literature-Based or Rote-Learning/Skill-Based)
31. Does the student have any of the following challenges to learning? (i.e., Attention Deficit, Auditory, Muscle Control, Visual, etc.)
32. On a scale from 1 to 5 - Is it important that the learning materials have an explicit religious orientation?
33. If it is important, what is your requested religious orientation? (i.e., Christian, Jewish, Muslim, etc.)

In various exemplary embodiments, the student performance information includes, for example, each student's individual curriculum information, report documents and data (such as test scores or a student's overall grade in a particular subject), and the like. It should be appreciated that the type and level of student performance information in the students database 135 may also vary, and is typically updated more frequently than the student personal information. The student performance information is typically updated by the systems and methods of this invention and is capable of being transmitted to, for example, the student's computer 110 for display.

It should be appreciated that the student personal information in the students database 135 and the product information in the products database 125 contain similar types of information, such that the characteristics of the products may be matched to the characteristics of the student.

The testing database 140 includes various suitable software programs and memory for storing and/or generating testing documents and data, such as, for example test questions and tests, evaluating student test responses, generating test score information, and the like.

Figure 3:
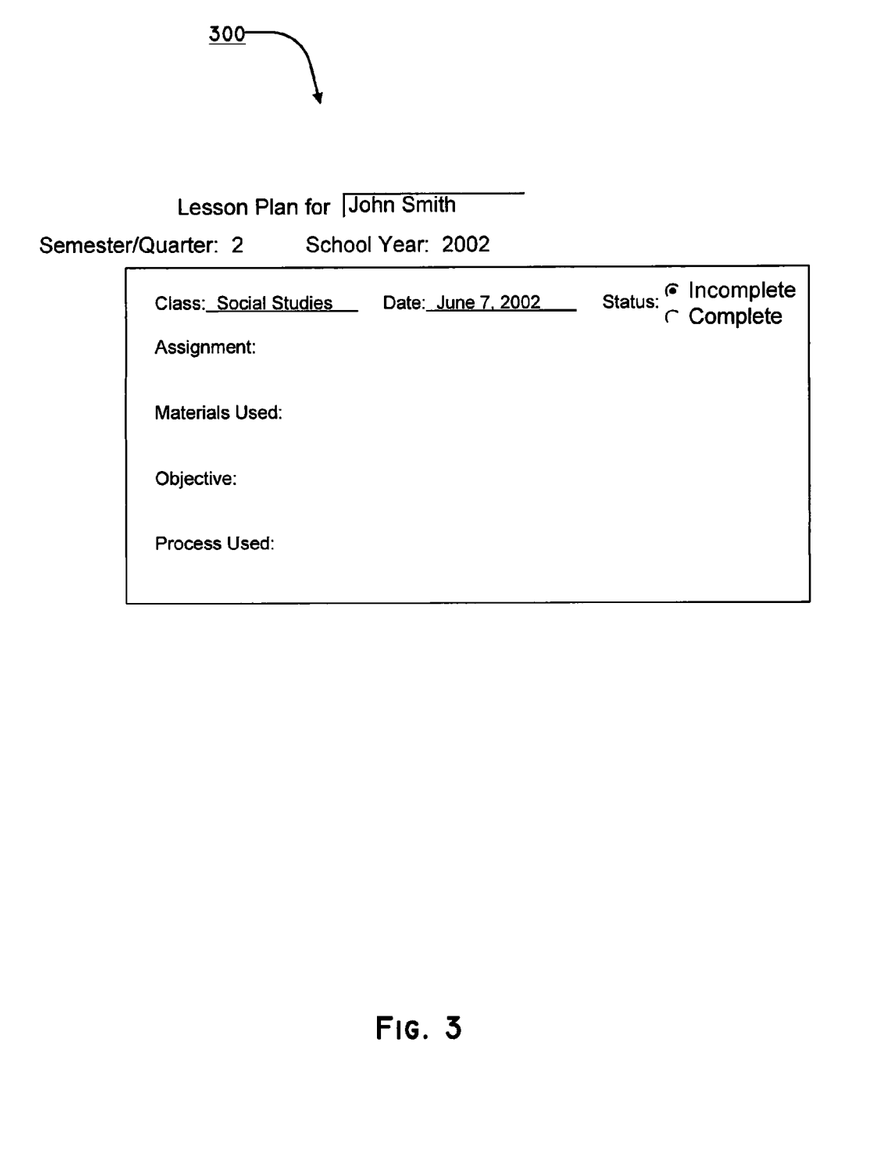
FIG. 3 shows one exemplary format of a template for displaying assignment data, in a predetermined format.

The curriculum database 145 includes various suitable software programs and memory for assessing a student's personal and/or performance information and developing and/or updating an individual student curriculum based on the student's personal and/or performance information. The curriculum database 145 may also contain templates for displaying curriculum information, such as assignment data, in a predetermined format. An example of one exemplary format is shown in FIG. 3.

The reports database 150 includes various suitable software programs and memory for receiving a student's personal and/or performance information and producing report documents and data, which may include, for example, raw test score information and/or filtered test data, such as a letter grade that corresponds to the raw test score information. The reports database 150 may also contain templates for displaying performance information, such as score and grade data, in a predetermined format as a progress report or a periodic report card.

It should be appreciated that the information, such as curriculum or performance information may be displayed electronically or reduced to a printed format.

As shown in FIG. 1, the products database 125, the criteria database 130, the students database 135, the testing database 140, the curriculum database 145, the reports database 150, or any other accessible database (not shown) may be implemented, individually, separately, or as complimentary components, using any appropriate combination of alterable, volatile, non volatile, non alterable, or fixed, memory. The alterable memory, whether volatile or non volatile, can be implemented using any one or more of non-selectable or performance RAM, a floppy disk and disk drive, a writable or re rewriteable optical disk and disk drive, a hard drive, flash memory or the like. Similarly, the non alterable or fixed memory can be implemented using any one or more of ROM, PROM, EPROM, EEPROM, an optical ROM disk, such as a CD ROM or DVD ROM disk, and disk drive or the like.

In various exemplary embodiments, the products database 125, the criteria database 130, the students database 135, the testing database 140, the curriculum database 145, the reports database 150, or any other accessible database (not shown) store software and data used by the education management system 100. The server 120 manages reading data from and writing data to the products database 125, the criteria database 130, the students database 135, the testing database 140, the curriculum database 145, the reports database 150, or any other accessible database (not shown). The server 120 also drives the transmission of data to and the reception of data from each of the computers 110 and the management computer 115.

Thus, in various exemplary embodiments, each of the computers 110 and the management computer 115 is able to access, store, retrieve, and process information from any one or more of the products database 125, the criteria database 130, the students database 135, the testing database 140, the curriculum database 145, the reports database 150, the distributed network 105, or any other accessible database (not shown). In this manner, it is not essential that any particular information be stored in the products database 125, the criteria database 130, the students database 135, the testing database 140, the curriculum database 145, or the reports database 150. Alternatively, this information can be stored in, for example, management computer 115, the server 120, and/or the distributed network 105.

In various exemplary embodiments, the education management system 100 will include software executing on the server 120. It should be appreciated that any other known or later developed system capable of processing and outputting data could be used in place of the server 120.

In the various exemplary embodiments described herein, each of the computers 110, the management computer 115, the server 120 interface, for example, with the network 105, via a linked connection. Likewise, the products database 125, the criteria database 130, the students database 135, the testing database 140, the curriculum database 145, the reports database 150 interface, for example, with the network 105, via a linked connection.

The linked connections may be any known or later developed device or system for connecting any of the computers 110, the management computer 115, the server 120, the products database 125, the criteria database 130, the students database 135, the testing database 140, the curriculum database 145, the reports database 150, and/or the network 105, including a direct wired connection, a connection over a LAN, a WAN, or any other distributed network, a connection over the public switched telephone network, a connection over a coaxial cable (i.e., CATV) system, a connection over a cellular telephone network, a satellite connection or the like. In general, the linked connections may be any known or later developed connection system or structure usable to connect any of the computers 110, the management computer 115, the server 120, the products database 125, the criteria database 130, the students database 135, the testing database 140, the curriculum database 145, the reports database 150, and/or the network 105, including both wired and wireless connections.

Figure 2:
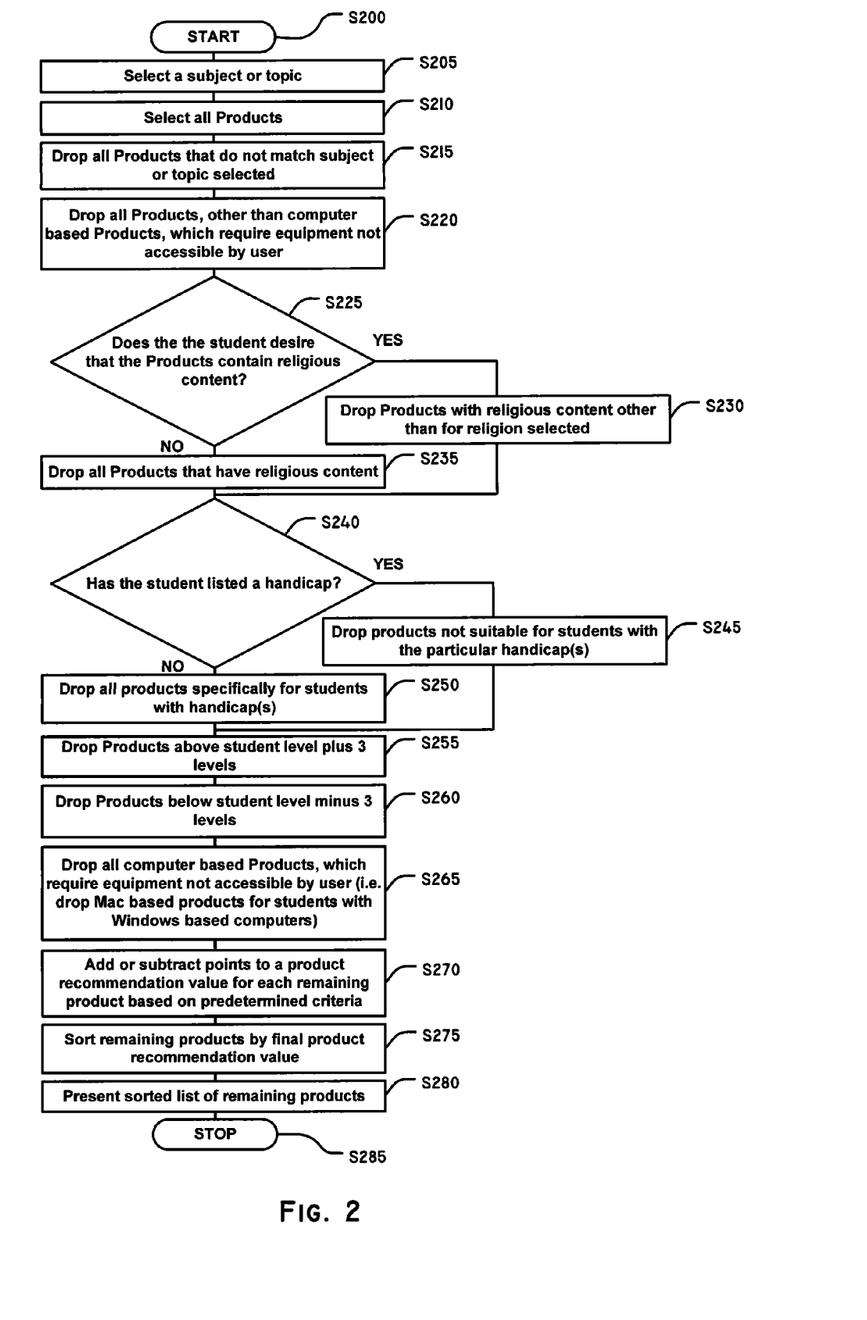
FIG. 2 shows a flowchart outlining one exemplary embodiment of a method for recommending resources and course materials in a specific subject or topic, based on a specific student profile, according to this invention.

FIG. 2 shows a flowchart outlining one exemplary embodiment of a method for recommending resources and course materials in a specific subject or topic, based on a specific student profile, according to this invention.

As shown in FIG. 2, beginning in step S200, the method begins and control continues to step S205, wherein a specific subject or topic is selected. Then, in step S210, all offered products, regardless of the specific subject or topic selected. Control then continues to step S215.

In step S215, all of the products that are offered, which do not match the subject or topic selected, are removed from the list of selected offered products. Control then continues to step S220, where all of the remaining selected offered products that require equipment for use of the product that the student does not have access to (except for computer based products) are removed from the list of selected offered products. In various exemplary embodiments, information regarding the equipment that the student has access to is stored as specific student profile information in the students database 135.

Then, in step S225, a determination is made as to whether the student desires that the offered products contain religious content. This may be accomplished, for example, by accessing information regarding the student's religious preferences, if included in the specific student profile information stored in the students database 135.

If, in step S225 it is determined that the student desires that the offered products contain religious content, control advances to step S230 and all of the products that are offered, which do not match the student's religious preference, are removed from the list of selected offered products. This may be accomplished, for example, by accessing information regarding each product's religious content, as included in the inherent product information or the evaluation product information stored in the products database 125 and comparing that information to the information included in the specific student profile information stored in the students database 135.

Otherwise, if it is determined, in step S225, that the student desires that the offered products do not contain religious content, control jumps to step S235.

In step S235, all of the selected offered products, which contain religious content are removed from the list of selected offered products. This may be accomplished, as described above, by accessing information regarding each product's religious content, as included in the inherent product information or the evaluation product information stored in the products database 125.

Then, in step S240, a determination is made as to whether the student has listed any handicaps. This may be accomplished, for example, by accessing information regarding the student in the specific student profile information stored in the students database 135. It should be appreciated that the handicap may be a mental or a physical handicap.

If, in step S240 it is determined that the student has listed a handicap, control advances to step S245 and all of the products that are offered, which are not suitable for students with the listed handicap(s) are removed from the list of selected offered products. This may be accomplished by accessing each product's inherent product information or evaluation product information stored in the products database 125 and comparing that information to the information included in the specific student profile information stored in the students database 135.

Otherwise, if it is determined, in step S240, that the student has not listed a handicap, control jumps to step S250.

In step S250, all of the selected offered products, which are specifically for students with a handicap, are removed from the list of selected offered products. This may be accomplished, as described above, by accessing each product's inherent product information or evaluation product information stored in the products database 125.

Next, in step S255, all products that are designated to be a predetermined number of levels above the student's level, for example, the student's level plus 3 levels, are removed from the list of selected offered products. Then, in step S260, all products that are designated to be a predetermined number of levels below the student's level, for example, the student's level minus 3 levels, are removed from the list of selected offered products.

Then, in step S265, all offered products that are computer based products, which require equipment not accessible by user (i.e., Mac based products for students with Windows based computers) are removed from the list of selected offered products.

Control then continues to step S270 and points are added to or subtracted from a product recommendation value for each of the remaining selected offered products. The points are added to or subtracted from each remaining product's product recommendation value based on predetermined criteria. These criteria are stored in the criteria database 130, as described above, with reference to FIG. 1. In various exemplary embodiments, the predetermined criteria and the number of points to be added or subtracted for each predetermined criteria are as listed below in TABLE III. However, it should be appreciated that the predetermined criteria and the number of points to be added or subtracted for each predetermined criteria, as listed in TABLE III, are merely exemplary, and are not intended to be an exhaustive list of criteria. Specific predetermined criteria and associated point values may be created or deleted based on the particular application.

When a final recommendation value has been calculated for each of the remaining selected offered products, control continues to step S275.

TABLE III

Add points to each product from a preferred supplier list
Add points if product level matches students
Add points if product level is above students level
Add points if computer based product and student has computer
Add points if product and student match operating system
Add points if product and student are both 'remedial'
Add points if product and student are both 'advanced' learning ability
Add points if product and student environment match
Add points if product is computer based and students computer is less than 2 years old
Add points if product is internet based and student has any internet access
Add points if product is internet based and student has connection above 56k internet access
Add points if product and student match online service
Add points if product does not require the student to read and student has low ability
Subtract points if product requires the student to read and student has low ability
Add points if match for self pace or subtract 20 points if product not a match
Add points if match for keyboard or subtract 20 points if product not a match
Add points if match for mouse or subtract 20 points if product not a match
Add points if match for interactive or subtract 20 points if product not a match
Add points if match for compete or subtract 20 points if product not a match
Add points if match for learning style or subtract 50 points if product not a match
Add points if student is remedial and product level is below students
Add points if student is advanced and product level is above students In step S275, the remaining selected offered products are sorted by their final recommendation value, such that the product or products with the highest final recommendation value are ranked above the product or products with the lowest final recommendation value. In various exemplary embodiments, the remaining selected offered products may be sorted such that the product or products with the lowest final recommendation value are ranked above the product or products with the highest final recommendation value.

Then, in step S280, the sorted list of the remaining selected offered products is displayed or presented to the user or student. In various exemplary embodiments, any remaining selected offered products with a final recommendation value above a predetermined minimum value or below a predetermined maximum value are not included in the sorted list that is displayed or presented to the user or student. Then, in step S285, the method ends.

It should be appreciated that the systems and methods of this invention may be implemented as software executing on a programmed general-purpose computer, a special purpose computer, a microprocessor, or the like. In various exemplary embodiments, the systems and methods of this invention may be implemented as a routine embedded in a network client, as a resource residing on a network server, or the like. The systems and methods of this invention may also be implemented by incorporation into a software and/or hardware system, such as the hardware or firmware systems of another personal digital assistant, bi directional pager, analog or digital cellular telephone, or the like.

Thus, in summary, the systems and methods of this invention may be implemented on a programmed general purpose computer, a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowchart shown in FIG. 2, can be used to implement the systems and methods of this invention.

While this invention has been described in conjunction with the exemplary embodiments outlined above, it is evident that many alternatives, modifications, and variations will be apparent to those skilled in the art. For example, the method for recommending resources and course materials in a specific subject or topic, based on a specific student profile, as described herein, may be used to recommend other products to consumers, based on a specific consumer and product profiles.

Accordingly, the foregoing description of the these exemplary embodiments will reveal the general nature of the invention, such that others may, by applying current knowledge, readily modify and/or adapt for various applications these exemplary embodiments without departing from the spirit and scope of the invention. Therefore, such adaptations and modifications should and are intended to be comprehended within the meaning and range of equivalents of the disclosed exemplary embodiments. It is to be understood that the phraseology of terminology employed herein is for the purpose of description and not of limitation.

What is claimed is:

1. A method for recommending one or more products to a consumer, comprising:
    accessing a product profile database in a computer accessible medium, wherein said product profile database contains at least some product information for each product, wherein said product information includes at least some inherent product information and at least some subjective product evaluation information, wherein said subjective product evaluation information includes at least some information that is different from said inherent product information in said product profile database, and wherein said subjective product evaluation information includes information gained from a subjective evaluation of each product's suitability for specific consumers;
    accessing at least one first consumer profile database in a computer accessible medium, wherein said first consumer profile database contains at least some consumer profile information;
    accessing at least one second consumer profile database in a computer accessible medium, wherein said second consumer profile database contains at least some previously stored, supplemental consumer profile information for said specific consumer, wherein said supplemental consumer profile information includes at least some consumer profile information that is different from said consumer profile information in said first consumer profile database;
    allowing a consumer to request, via a computer, information regarding a specific product from said product profile database;
    selecting, via a computer processor, all products in said product profile database, regardless of said product requested by said consumer;
    removing from said selected products, via said computer processor, all of said products that are not included in a similar product area with said product requested by said consumer;
    establishing an initial product recommendation value for each of said remaining selected products based on said inherent product information;
    transforming said initial product recommendation value for each of said remaining selected products based on a comparison of said subjective product evaluation information and at least some consumer profile information and/or supplemental consumer profile information for said specific consumer to produce a final recommendation value for each of said remaining selected products;
    creating a ranked list of said remaining selected products by ranking said remaining selected products by each remaining selected product's final recommendation value;
    transforming data regarding at least a portion of said ranked list of said remaining selected products into at least one displayable representation of said data regarding said ranked list of said remaining selected products; and
    displaying at least a portion of said at least one displayable representation of said data regarding said ranked list of said remaining selected products to said consumer.

2. The method of claim 1, wherein two or more of said product profile database, said at least one first consumer profile database, and said at least one second consumer profile database are contained within a single database.

3. The method of claim 1, further comprising:
    removing, if said consumer profile information for said specific consumer indicates that said specific consumer wants products that contain other content with an indicated other preference, via said computer processor, all of said remaining selected products that do not match said indicated other preference, wherein information regarding said indicated other preference is included in said consumer profile information or said supplemental consumer profile information, and wherein information regarding said other content of each product is included in said inherent product information or said subjective product evaluation information.

4. The method of claim 1, wherein said inherent product information includes one or more of each product's name or title, manufacturer, distributor, supplier, price, availability, at least one product keyword, and the like.

5. The method of claim 1, wherein said subjective evaluation of each product's suitability for a specific consumer is based on certain evaluation criteria by which one or more products are to be evaluated.

6. The method of claim 1, wherein at least some of said consumer profile information and at least some of said product information contain similar types of information, such that at least certain characteristics of said products may be matched to at least certain characteristics of said consumer.

7. A method for recommending specific services to a consumer, comprising:
    accessing a service profile database in a computer accessible medium, wherein said service profile database contains at least some service information for each service, wherein said service information includes at least some inherent service information and at least some subjective service evaluation information, wherein said subjective service evaluation information includes at least some information that is different from said inherent service information in said service profile database, and wherein said subjective service evaluation information includes information gained from a subjective evaluation of each service's suitability for specific consumers;

accessing at least one first consumer profile database in a computer accessible medium, wherein said first consumer profile database contains at least some consumer profile information;

accessing at least one second consumer profile database in a computer accessible medium, wherein said second consumer profile database contains at least some previously stored, supplemental consumer profile information for said specific consumer, wherein said supplemental consumer profile information includes at least some consumer profile information that is different from said consumer profile information in said first consumer profile database;

allowing a consumer to request, via a computer, information regarding a specific service from said service profile database;

selecting, via a computer processor, all services in said service profile database, regardless of said service requested by said consumer;

removing from said selected services, via said computer processor, all of said services that are not included in a similar service area with said service requested by said consumer;

establishing an initial service recommendation value for each of said remaining selected services based on said inherent service information;

transforming said initial service recommendation value for each of said remaining selected services based on a comparison of said subjective service evaluation information and at least some consumer profile information and/or supplemental consumer profile information for said specific consumer to produce a final service recommendation value for each of said remaining selected services;

creating a ranked list of said remaining selected services by ranking said remaining selected services by each remaining selected service's final service recommendation value;

transforming data regarding at least a portion of said ranked list of said remaining selected services into at least one displayable representation of said data regarding said ranked list of said remaining selected services; and displaying at least a portion of said at least one displayable representation of said data regarding said ranked list of said remaining selected services to said consumer.

8. The method of claim 7, wherein two or more of said service profile database, said at least one first consumer profile database, and said at least one second consumer profile database are contained within a single database.

9. The method of claim 7, further comprising:

removing, if said consumer profile information for said specific consumer indicates that said specific consumer wants services that contain other content with an indicated other preference, via said computer processor, all of said remaining selected services that do not match said indicated other preference, wherein information regarding said indicated other preference is included in said consumer profile information or said supplemental consumer profile information, and wherein information regarding said other content of each service is included in said inherent service information or said subjective service evaluation information.

10. A method of claim 7, wherein said inherent service information includes one or more of each service's name or title, manufacturer, distributor, supplier, price, availability, at least one service keyword, and the like.

11. The method of claim 7, wherein said subjective evaluation of each service's suitability for a specific consumer is based on certain evaluation criteria by which one or more services are to be evaluated.

12. The method of claim 7, wherein at least some of said consumer profile information and at least some of said service information contain similar types of information, such that at least certain characteristics of said services may be matched to at least certain characteristics of said consumer.

* * * * *